United States Patent Office 2,769,010
Patented Oct. 30, 1956

2,769,010

PROPARGYL ETHERS OF AZOLES

John J. D'Amico, Charleston, W. Va., assignor to Monsanto Chemical Company, St. Louis, Mo., a corporation of Delaware No Drawing. Application April 18, 1955,
Serial No. 502,245

19 Claims. (Cl. 260—302)

This invention relates to a new class of compounds and to the method of making them. More particularly, the present invention relates to mixed ethers one substituent of which is derived from an azole and the other from an alkyne hydrocarbon.

The new compounds contain the characteristic grouping

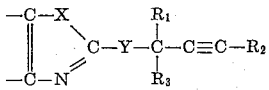

where $R_1$, $R_2$ and $R_3$ are hydrogen or short chain alkyl groups such as methyl, ethyl, propyl, butyl and amyl and where X and Y are oxygen or sulfur. The dangling valences on the azole ring are satisfied by hydrogen, short chain alkyl radicals, short chain carboalkoxy radicals, acetyl, carboxy or residues of carbocyclic radicals. The azolyl radicals include bi-radicals. A general formula of the new compounds is $[(T-Y)_w C_n H_{2n-(w+2)}]_z$ where T represents a radical containing the azole ring attached at the 2-position to Y in which the valences of the carbon atoms in the 4- and 5-position are satisfied by a member of the group consisting of hydrogen, alkyl radicals containing less than 5 carbon atoms, carboalkoxy radicals containing less than 6 carbon atoms, acetyl and carboxy radicals and residues of carbocyclic radicals, said carbocyclic radicals containing less than 11 carbon atoms and being selected from the group consisting of unsubstituted ortho-arylene, chloro substituted ortho-arylene, hydrocarbon substituted ortho-arylene, alkoxy substituted ortho-phenylene, hydroxy substituted ortho-phenylene and unsubstituted phenenyl radicals having two of the three valences on adjacent carbon atoms, Y is selected from the group consisting of oxygen and sulfur, $C_n H_{2n-(w+2)}$ represents a radical derived from an alkyne hydrocarbon by removal of at least one but less than three hydrogen atoms, having the triple bond in the beta position, $w$ and $z$ are integers at least 1 but less than 3 and $n$ is an integer at least 3 but not more than 8. The new compounds, which are termed propargyl ethers of azoles for purposes of this invention, may be prepared by the general method which has been employed for making propargyl ethers of phenols, namely heating a propargyl halide with the azole in acetone solution in the presence of potassium carbonate. However, a cheaper and more convenient method has been discovered which comprises reacting a propargyl halide such as propargyl chloride or higher alkyl homologues thereof with the azole in aqueous solution in the form of an alkali metal salt. Examples of suitable propargyl chlorides (or 3-chloropropynes) are propargyl chloride, γ-methyl-propargyl chloride (or 1-chloro-2-butyne), α,α,γ-trimethyl-propargyl chloride, γ-ethyl-propargyl chloride, γ-propyl-propargyl chloride, γ-butyl-propargyl chloride and γ-amyl-propargyl chloride. While other halides may be employed instead of the chloride, they are more expensive.

The following examples are illustrative of the new compounds and the preparation thereof but in no manner are to be construed as limitative of this invention.

EXAMPLE 1

*2-(2-butynylmercapto)benzothiazole*

A solution of sodium 2-mercaptobenzothiazole was prepared by mixing 156 grams (0.85 mole) of 2-mercaptobenzothiazole, 136 grams (0.85 mole) of 25% aqueous sodium hydroxide solution and 910 grams of water. The resulting solution was filtered to remove any insoluble impurities and to the filtrate there was added 73 grams (0.82 mole) of 1-chloro-2-butyne. An exothermic reaction set in immediately, the temperature of the reaction mixture rising from 27° C. to 35° C. over a period of 20 minutes. The reaction mixture was stirred for approximately 24 hours and the solid product separated by filtration, washed with water until the washings were neutral to litmus and dried at 50° C. A tan powder, M. P. 68–70° C., was obtained in 82.4% yield. After recrystallization from ethyl alcohol, the melting point was 72–73° C. Analysis gave 6.35% nitrogen and 29.57% sulfur as compared to 6.39% nitrogen and 29.24% sulfur calculated for $C_{11}H_9NS_2$.

EXAMPLE 2

*5-chloro-2-(2-propynylmercapto)benzothiazole*

A solution of sodium 5-chloro-2-mercaptobenzothiazole was prepared by mixing 224 grams (1.0 mole) of 5-chloro-2-mercaptobenzothiazole, 160 grams (1.0 mole) of 25% aqueous sodium hydroxide and 1000 ml. of water. To the solution so prepared was added and intimately mixed 107 grams (0.9 mole) of propargyl bromide. An exothermic reaction set in immediately the temperature of the reaction mixture rising from 24 to 34° C. over a period of 5 minutes. The reaction mixture was stirred for about 5 hours, filtered, and the filter cake washed with water until the washings were neutral to litmus. Upon drying the filter cake a tan colored solid melting at 64–66° C. was obtained in 86.5% yield. After recrystallization from ethyl alcohol, the melting point was 70–71° C. Analysis gave 5.97% nitrogen, 26.71% sulfur and 14.52% chlorine as compared to 5.84% nitrogen, 26.75% sulfur and 14.7% chlorine calculated for $C_{10}H_6ClNS_2$.

EXAMPLE 3

*2-(2-propynylmercapto)-benzothiazole*

A solution of sodium 2-mercaptobenzothiazole was prepared by mixing 172 grams (1.0 mole) of 97% mercaptobenzothiazole, 160 grams (1.0 mole) of 25% aqueous sodium hydroxide solution and 1000 grams of water. The resulting solution was filtered to remove any insolubles and to the filtrate there was added 119 grams (1.0 mole) of propargyl bromide. An exothermic reaction set in immediately, the temperature rising from 24 to 36° C. over a period of 5 minutes. The reaction mixture was stirred for about 5 hours whereupon it was extracted with 500 ml. of diethyl ether. The ether extract was washed with water until the washings were neutral to litmus and dried. The ether solvent was removed in vacuo. An amber colored oil was obtained in 89.7% yield. Analysis gave 6.89% nitrogen and 31.38% sulfur as compared to 6.82% nitrogen and 31.24% sulfur calculated for $C_{10}H_7NS_2$.

EXAMPLE 4

*4-methyl-2-(2-propynylmercapto)-benzothiazole*

A solution of sodium 4-methyl-2-mercaptobenzothiazole was prepared by mixing 101 grams (0.5 mole) of 90% 4-methyl-2-mercaptobenzothiazole, 80 grams (0.5 mole) of 25% aqueous sodium hydroxide solution and 500 grams of water. The resulting solution was filtered to remove any insolubles and to the filtrate there was added 59.5 grams (0.5 mole) of propargyl bromide. An exothermic reaction set in immediately, the temperature rising from 20 to 29° C. over a period of 5 minutes. The reaction mixture was stirred for about 5 hours whereupon it was extracted with 500 ml. of diethyl ether. The ether extract was washed with water until the washings were neutral to litmus and dried. The ether solvent was then removed in vacuo. An amber colored oil was obtained in 94.7% yield. Analysis gave 6.37% nitrogen as compared to 6.39% nitrogen calculated for $C_{11}H_9NS_2$.

EXAMPLE 5

*6-ethoxy-2-(2-propynylmercapto)-benzothiazole*

A solution of 6-ethoxy-2-mercaptobenzothiazole was prepared by mixing 82 grams (0.35 mole) of 90% 6-ethoxy-2-mercaptobenzothiazole, 56 grams (0.35 mole) of 25% aqueous sodium hydroxide and 500 ml. of water. To the solution so prepared was added and intimately mixed 41.6 grams (0.35 mole) of propargyl bromide. An exothermic reaction set in immediately, the temperature of the reaction mixture rising from 20 to 29° C. over a period of 5 minutes. The reaction mixture was stirred for about 5 hours, filtered, and the filter cake washed with water until the washings were neutral to litmus. Upon drying the filter cake a grey colored solid melting at 85–86° C. was obtained. Analysis gave 5.66% nitrogen and 25.75% sulfur as compared to 5.62% nitrogen and 25.72% sulfur calculated for $C_{12}H_{11}NOS_2$.

EXAMPLE 6

*2,2'-bis-(2-propynylmercapto)-6,6'-dibenzothiazole*

To an agitated solution containing 66.5 grams (0.2 mole) of 2,2'-dimercapto-6,6'-dibenzothiazole, 64 grams (0.4 mole) of 25% aqueous sodium hydroxide, and 500 ml. of water was added 47.6 grams (0.4 mole) of propargyl bromide. An exothermic reaction set in immediately, the temperature of the reaction mixture rising from 26 to 40° C. over a period of 5 minutes. The reaction mixture was stirred for 20 hours, filtered, and the filter cake washed with water until the washings were neutral to litmus. Upon drying a tan colored solid melting at 178–181° C. was obtained in a 95.8% yield. After recrystallization from benzene the melting point was 184–186° C. Analysis gave 6.86% nitrogen and 30.85% sulfur as compared to 6.86% nitrogen and 31.39% sulfur calculated for $C_{20}H_{12}N_2S_4$.

EXAMPLE 7

*4-methyl-2-(2-propynylmercapto)thiazole*

A solution of sodium 2-mercapto-4-methylthiazole was prepared by stirring 65.6 grams (0.5 mole) of 2-mercapto-4-methylthiazole, 500 ml. of water and 80 grams (0.5 mole) of 25% aqueous sodium hydroxide for about 15 minutes. The solution was filtered to remove any impurities and to the clear stirred filtrate there was added 59.5 grams (0.5 mole) of propargyl bromide. An exothermic reaction set in, the temperature rising from 24 to 35° C. over a period of about 5 minutes. The reaction mixture was stirred for about 5 hours, 500 ml. of ethyl ether was added and the stirring continued for 15 minutes. The ether solution was washed with water until the washings were neutral to litmus and dried over sodium sulfate. The ether was removed in vacuo. The product obtained as the residue in 91.4% yield was an amber oil. Analysis gave 8.36% nitrogen and 38.09% sulfur as compared to 8.27% nitrogen and 37.88% sulfur calculated for $C_7H_7NS_2$.

EXAMPLE 8

*Ethyl, 4-methyl-2-(2-propynylmercapto)-5-thiazole-carboxylate*

A solution of 5-carbethoxy-4-methyl-2-thiazolethiol (Levi, Gass. Chem. Ital. 61, p. 723, 1931) was prepared by mixing 50.8 grams (0.25 mole) of 5-carbethoxy-4-methyl-2-thiazolethiol, 250 grams of water and 40 grams (0.25 mole) of 25% aqueous sodium hydroxide. To the solution so prepared was added and intimately mixed 29.8 grams (0.25 mole) of propargyl bromide. An exothermic reaction set in immediately, the temperature of the reaction mixture rising from 27 to 36° C. in about 5 minutes. The reaction mixture was stirred for about 5 hours, filtered and the filter cake washed with water until the washings were neutral to litmus. Upon drying the filter cake a tan colored solid, M. P. 46–49° C., was obtained in 98% yield. After recrystallization from dilute ethyl alcohol the melting point was 50–51° C. Analysis gave 6.12% nitrogen and 26.69% sulfur as compared to 5.80% nitrogen and 26.57% sulfur calculated for $C_{10}H_{11}NO_2S_2$.

EXAMPLE 9

*Methyl, 4-methyl-2-(2-propynylmercapto)-5-thiazole-carboxylate*

A solution of 5-carbomethoxy-4-methyl-2-thiazolethiol was prepared by mixing 48.3 grams (0.25 mole) of 5-carbomethoxy-4-methyl-2-thiazolethiol, 250 grams of water and 40 grams (0.25 mole) of 25% aqueous sodium hydroxide. To the solution so prepared was added and intimately mixed 29.8 grams (0.25 mole) of propargyl bromide. An exothermic reaction set in immediately, the temperature of the reaction mixture rising from 27 to 36° C. in about 5 minutes. The reaction mixture was stirred for about 5 hours, filtered and the filter cake washed with water until the washings were neutral to litmus. Upon drying the filter cake a tan colored solid, M. P. 68–72° C., was obtained in 83.7% yield. After recrystallization from dilute ethyl alcohol the melting point was 79–80° C. Analysis gave 6.44% nitrogen and 28.40% sulfur as compared to 6.16% nitrogen and 28.21% sulfur calculated for $C_9H_9NO_2S_2$.

EXAMPLE 10

*4-methyl-2-(2-propynylmercapto)-5-thiazolyl methyl ketone*

A solution of 2-mercapto-4-methyl-5-thiazolyl methyl ketone (described in co-pending application Serial No. 294,930, filed June 21, 1952) was prepared by mixing 43.3 grams (0.25 mole) of 2-mercapto-4-methyl-5-thiazolyl methyl ketone, 250 grams of water and 40 grams (0.25 mole) of 25% aqueous sodium hydroxide. To the solution so prepared was added and intimately mixed 29.8 grams (0.25 mole) of propargyl bromide. An exothermic reaction set in immediately, the temperature of the reaction mixture rising from 26 to 34° C. over a period of 5 minutes. The reaction mixture was stirred for about 5 hours, filtered, and the filter cake washed with water until the washings were neutral to litmus. Upon drying the filter cake a tan colored product melting at 62–64° C. was obtained in 91% yield. After recrystallization from dilute ethyl alcohol, the melting point was 65–66° C. Analysis gave 6.62% nitrogen and 30.29% sulfur as compared to 6.63% nitrogen and 30.35% sulfur calculated for $C_9H_9NOS_2$.

EXAMPLE 11

*2-(2-propynylmercapto)-benzoxazole*

A solution of 2-mercaptobenzoxazole was prepared by mixing 75.6 grams (0.5 mole) of 2-mercaptobenzoxazole, 500 grams of water and 80 grams (0.5 mole) of 25% aqueous sodium hydroxide. To the solution so prepared was added 59.5 grams (0.5 mole) of propargyl bromide. An exothermic reaction set in, the temperature of the reaction mixture rising from 28 to 35° C. over a 20 minute period. The reaction mixture was stirred for about 8 hours, filtered and the filter cake washed with water until the washings were neutral to litmus. Upon air drying the filter cake at 25° C., the product was obtained in 95% yield. After recrystallization from dilute ethyl alcohol it melted at 51° C. Analysis gave 7.57% nitrogen and 16.95% sulfur as compared to 7.40% nitrogen and 16.95% sulfur calculated for $C_{10}H_7NOS$.

EXAMPLE 12

*2-(2-propynoxy)-benzothiazole*

A solution of hydroxy benzothiazole was prepared by mixing 75.6 grams (0.5 mole) of hydroxy benzothiazole, 80 grams (0.5 mole) of 25% aqueous sodium hydroxide and 500 grams of water. To the solution so prepared was added 59.5 grams (0.5 mole) of propargyl bromide. An exothermic reaction set in, the temperature rising from 26° C. to 31° C. within one hour. The reaction mixture was stirred for about 20 hours, extracted with 500 ml. of ether, the ether layer washed with water until neutral, and dried over sodium sulfate. The ether was removed in vacuo. The solid which resulted had a melting point of 76–78° C. Analysis gave 7.80% nitrogen and 17.35% sulfur as compared to 7.40% nitrogen and 16.95% sulfur calculated for $C_{10}H_7NOS$.

EXAMPLE 13

*2,2'-(2-butynylenedimercapto)bisbenzothiazole*

A solution of sodium 2-mercaptobenzothiazole was prepared by mixing 86 grams (0.5 mole) of 97% mercaptobenzothiazole, 32.2 grams (0.5 mole) of 87% potassium hydroxide and 500 grams of ethyl alcohol. The resulting solution was filtered to remove any insolubles and to the filtrate there was added dropwise over a half hour period 37.5 grams (0.25 mole) of 1,4-dichloro-2-butyne. An exothermic reaction set in, the temperature rising from 25° C. to 50° C. The reaction mixture was stirred for 18 hours and then poured into 1000 grams of cold water. After stirring for 15 minutes the precipitate was filtered, washed with water until neutral to litmus and air-dried at 25° C. A tan colored solid melting at 170–174° C. was obtained in 96.5% yield. After recrystallization from benzene the melting point was 177–179° C. Analysis gave 7.08% nitrogen compared to 7.28% calculated for $C_{18}H_{12}N_2S_4$.

Other examples of the new compounds are 5-methyl-2-(2-propynylmercapto)benzothiazole, 6-methyl-2-(2-propynylmercapto)benzothiazole, 7-methyl-2-(2-propynylmercapto)benzothiazole, 4,6-dimethyl-2-(2-propynylmercapto)benzothiazole, 4-chloro-2-(2-propynylmercapto)benzothiazole, 5-chloro-2-(2-propynylmercapto)benzoxazole, 6-chloro-2-(2-propynylmercapto)-benzoxazole, 7-chloro-2-(2-propynylmercapto)benzoxazole, 6-phenyl-2-(2-propynylmercapto)benzothiazole, 6-methoxy-2-(2-propynylmercapto)benzothiazole, 5-ethoxy-2-(2-propynylmercapto)-benzoxazole, 5-methoxy-2-(2-propynylmercapto)benzoxazole, 2-(2-propynylmercapto)naphthothiazole, 4,5-dimethyl-2-(2-propynylmercapto)thiazole, 4-ethyl-2-(2-propynylmercapto)thiazole, 4-propyl-2-(2-propynylmercapto)thiazole, 4-butyl-2-(2-propynylmercapto)thiazole, butyl-4-methyl-2-(2-propynylmercapto)-5-thiazolecarboxylate and 4-methyl-2-(2-propynylmercapto)-5-thiazolecarboxylate. In the case of derivatives of aliphatic thiazoles it is preferred that at least one alkyl group is present and that the alkyl group is a short chain alkyl group, as for example of one to four carbon atoms inclusive. Similarly, carboalkoxy groups in which the alkoxy group contains one to four carbon atoms inclusive are preferred. Furthermore, propargyl halides condense with 2-mercapto-4,5-dihydrothiazoles forming, for example 2-(2-propynylmercapto)-4,5-dihydrothiazole.

The new compounds possess accelerating properties for the vulcanization of rubber. They are preferably used in conjunction with a secondary accelerator like diphenyl guanidine. For example, a rubber stock was compounded comprising

| Stock | A | B | C |
|---|---|---|---|
| Smoked sheets rubber...........parts by weight.. | 100 | 100 | 100 |
| Zinc oxide.....................................do.... | 5 | 5 | 5 |
| Stearic acid...................................do.... | 1 | 1 | 1 |
| Sulfur.........................................do.... | 3 | 3 | 3 |
| 2-(2-Butynylmercapto)benzothiazole.........do.... | 0.7 | | |
| 2-(2-Propynylmercapto)benzothiazole........do.... | | 0.7 | |
| 6-Ethoxy-2-(2-propynylmercapto)benzothiazole parts by weight.. | | | 0.7 |
| Diphenyl guanidine...........................do.... | 0.3 | 0.3 | 0.3 |

The stocks so compounded were cured in the usual manner by heating in a press at 135° C. The modulus and tensile properties of the cured products are set forth below:

TABLE 1

| Stock | Cure Time in Mins. | Modulus of Elasticity in lbs./in.$^2$ at Elongation of 700% | Tensile at Break in lbs./in.$^2$ | Ultimate Elongation, Percent |
|---|---|---|---|---|
| A | 30 | 1,816 | 2,040 | 746 |
| B | 30 | 1,493 | 2,633 | 800 |
| C | 30 | 1,105 | 2,280 | 825 |
| A | 60 | 2,630 | 3,540 | 770 |
| B | 60 | 3,210 | 3,810 | 775 |
| C | 60 | 2,530 | 3,580 | 780 |

The new compounds are also valuable defoliants. The foliage of bean plants was completely destroyed by uniformly applying thereto an aqueous spray containing as the active ingredient a 1% concentration of 2-(2-butynylmercapto)benzothiazole. In pre-emergence application at the rate of 25 pounds per acre ethyl-4-methyl-2-(2-propynylmercapto)-5-thiazolecarboxylate and 2-(2-propynoxy)benzothiazole proved to be effective herbicides. Some of the compounds are fungicides, as for example 2-(2-propynylmercapto)benzoxazole.

It is intended to cover all changes and modifications of the examples of the invention herein chosen for purposes of disclosure which do not constitute departures from the spirit and scope of the invention.

This application is a continuation-in-part of application Serial No. 302,819, filed August 5, 1952, now abandoned, and application Serial No. 384,327, filed October 5, 1953, now abandoned.

What is claimed is:

1. A compound of the structure $$[(T—Y)_w C_n H_{2n-(w+2)}]_z$$

where T represents a radical containing the azole ring

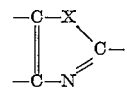

where X is selected from the group consisting of oxygen and sulfur attached at the 2-position to Y in which the valences of the carbon atoms in the 4- and 5-position are satisfied by a member of the group consisting of hydrogen, alkyl radicals containing less than 5 carbon atoms, carboalkoxy radicals containing less than 6 carbon atoms, acetyl and carboxy radicals and residues of carbocyclic radicals, said carbocyclic radicals containing less than 11 carbon atoms and being selected from the group consisting of unsubstituted ortho-arylene, chloro substituted ortho-arylene, hydrocarbon substituted ortho-arylene, alkoxy substituted ortho-phenylene, hydroxy substituted ortho-phenylene and unsubstituted phenenyl radicals having two of the three valences on adjacent carbon atoms, Y is selected from the group consisting of oxygen and sulfur, $C_n H_{2n-(w+2)}$ represents a radical derived from an alkyne hydrocarbon by removal of at least one but less than three hydrogen atoms, having the triple bond in the beta position, $w$ and $z$ are integers at least 1 but less than 3 and $n$ is an integer at least 3 but not more than 8.

2. The method which comprises reacting a halide of the structure $C_nH_{2n-(w+2)}X_w$ where X represents halogen and $C_nH_{2n-(w+2)}$ represents a radical derived from an alkyne hydrocarbon in which the triple bond is in the beta position, $w$ represents an integer at least 1 but less than 3 and $n$ represents an integer at least 3 but not more than 8, with an alkali metal salt of an azole of the structure

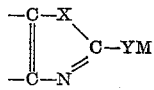

where M represents an alkali metal and X and Y are selected from the group consisting of oxygen and sulfur in which the valences of the carbon atoms in the 4- and 5-position are satisfied by a member of the group consisting of hydrogen, alkyl radicals containing less than 5 carbon atoms, carboalkoxy radicals containing less than 6 carbon atoms, acetyl and carboxy radicals and residues of carbocyclic radicals, said carbocyclic radicals containing less than 11 carbon atoms and being selected from the group consisting of unsubstituted ortho-arylene, chloro substituted ortho-arylene, hydrocarbon substituted ortho-arylene, alkoxy substituted ortho-phenylene, hydroxy substituted ortho-phenylene and unsubstituted phenenyl radicals having two of the three valances on adjacent carbon atoms.

3. A compound of the structure T—S—CH₂—R where T represents a radical containing the metathiazole ring attached at the 2-position to the sulfur atom in which the valences of the carbon atoms in the 4- and 5-positions are satisfied by the residue of an unsubstituted ortho-phenylene group and R represents a radical derived from an alkyne hydrocarbon group having less than 8 carbon atoms by removing one hydrogen atom and having the triple bond on the carbon next to the —CH₂— group.

4. A compound of the structure

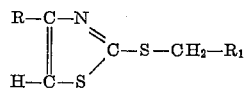

where R represents an alkyl group of less than 6 carbon atoms and R₁ represents a radical derived from an alkyne hydrocarbon group having less than 8 carbon atoms by removing one hydrogen atom and having the triple bond on the carbon next to the —CH₂— group.

5. A compound of the structure

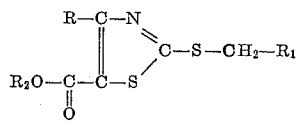

where R and R₂ represent alkyl groups containing less than 5 carbon atoms and R₁ represents a radical derived from an alkyne hydrocarbon group having less than 8 carbon atoms by removing one hydrogen atom and having the triple bond on the carbon next to the —CH₂— group.

6. A compound of the structure

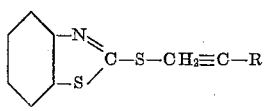

where R represents a lower alkyl radical.

7. A compound of the structure

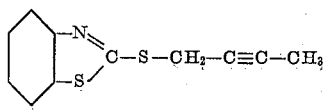

8. A compound of the structure

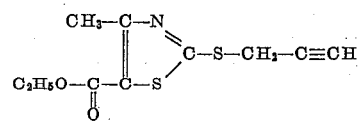

9. A compound of the structure

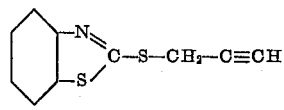

10. 5-chloro-2-(2-propynylmercapto)benzothiazole.

11. 6-ethoxy-2-(2-propynylmercapto)benzothiazole.

12. The method which comprises reacting a halide of the structure $C_nH_{2n-3}X$ where X represents halogen and $C_nH_{2n-3}$ represents a radical derived from an alkyne hydrocarbon in which the triple bond is in the beta position and $n$ represents an integer at least 3 but not more than 8, with an alkali metal salt of a 2-mercaptothiazole containing less than 14 carbon atoms and having a metathiazole ring attached to the sulfur atom in the 2-position in which the valences of the carbon atoms in the 4- and 5-positions are satisfied by a member of the group consisting of hydrogen, alkyl radicals containing less than 5 carbon atoms, carboalkoxy radicals containing less than 6 carbon atoms, acetyl and carboxy radicals and residues of carbocyclic radicals, said carbocyclic radicals containing less than 11 carbon atoms and being selected from the group consisting of unsubstituted ortho-arylene, chloro substituted ortho-arylene, alkoxy substituted ortho-phenylene and unsubstituted phenenyl radicals having two of the valances on adjacent carbon atoms in the thiazole ring and the third satisfied by a second phenenyl group also part of a thiazole ring.

13. The method of claim 12 wherein the halide is propargyl chloride.

14. The method which comprises reacting the sodium salt of a 2-mercapto arylene hydrocarbon thiazole containing less than 12 carbon atoms with a halide of the structure Cl—CH₂—R wherein R represents a radical derived from an alkyne hydrocarbon group having less than 8 carbon atoms by removing one hydrogen atom and having the triple bond on the carbon next to the —CH₂ group.

15. The method which comprises reacting sodium mercaptobenzothiazole with propargyl chloride in aqueous medium.

16. The method which comprises reacting sodium mercaptobenzothiazole with γ-methyl propargyl chloride in aqueous medium.

17. The method which comprises reacting the sodium salt of a 2-mercapto-4-alkyl thiazole of the structure

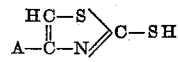

where A represents an alkyl group containing less than 5 carbon atoms with a halide of the structure Cl—CH₂—R wherein R represents a radical derived from an alkyne hydrocarbon group having less than 8 carbon atoms by removing one hydrogen atom and having the triple bond on the carbon next to the —CH₂ group.

18. The method which comprises reacting the sodium salt of 2-mercapto-4-alkyl-5-carboalkoxythiazole in which the alkyl group and alkoxy group each contain less than 5 carbon atoms with propargyl chloride in aqueous medium.

19. The method which comprises reacting propargyl chloride with the sodium salt of 2-mercapto-4-methyl-5-carbethoxythiazole in aqueous medium.

No references cited.